United States Patent [19]

Kohara et al.

[11] Patent Number: 5,399,646
[45] Date of Patent: Mar. 21, 1995

[54] ALKYLIDENENORBORNENE POLYMER AND PROCESS FOR PRODUCING THE SAME

[75] Inventors: Teiji Kohara, Kawasaki; Shin-ichiro Tahara, Yokohama; Yoshitsugu Hirokawa, Kamakura; Tadao Natsuume, Yokosuka, all of Japan

[73] Assignee: Nippon Zeon Co., Ltd., Tokyo, Japan

[21] Appl. No.: 92,585

[22] Filed: Jul. 16, 1993

Related U.S. Application Data

[63] Continuation of Ser. No. 812,482, Dec. 23, 1991, abandoned.

[30] Foreign Application Priority Data

Dec. 27, 1990 [JP] Japan ................................. 2-415129
Nov. 20, 1991 [JP] Japan ................................. 3-329642

[51] Int. Cl.⁶ ........................ C08F 32/08; C08F 4/14; C08F 4/16
[52] U.S. Cl. ........................ 526/282; 526/135; 526/145; 526/146; 526/147; 526/193; 526/204; 526/205; 526/208; 526/209; 526/210; 526/212; 526/216; 526/217; 526/220; 526/222; 526/224; 526/225; 526/237; 526/238; 526/268
[58] Field of Search ............ 526/282, 268, 237, 238, 526/145, 146, 147, 135, 193, 204, 205, 208, 209, 210, 212, 216, 217, 220, 222, 224, 225

[56] References Cited

U.S. PATENT DOCUMENTS 3,252,957  5/1966  Pledger, Jr. ........................ 526/282
4,100,338  7/1978  Suld et al.

FOREIGN PATENT DOCUMENTS 2639046  5/1990  France .

OTHER PUBLICATIONS

Hackh's Chemical Dictionary, 4th ed., McGraw-Hill Book Co., New York, 199 (1969).
Hackh's Chemical Dictionary, 4th edition, McGraw-Hill Inc., N.Y., 331 (1969).
Makromol. Chem., Rapid Commun. 1, 467–472 (1980).
La Chimica E L'Industria vol. 45 N. 12–Dec. 1963.

Primary Examiner—Fred Teskin
Attorney, Agent, or Firm—Armstrong, Westerman, Hattori, McLeland & Naughton

[57] ABSTRACT

The present invention discloses an alkylidenenorbornene polymer comprising as the essential constituent at least one kind of the structural unit represented by the formula

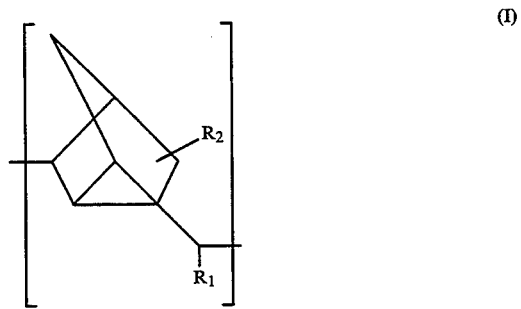

wherein $R_1$ denotes an alkyl group of 1–4 carbon atoms and $R_2$ denotes a hydrogen atom or an alkyl group of 1–5 carbon atoms, and a process for producing the same.

According to the present invention, an alkylidenenorbornene polymer is obtained which is excellent in light resistance, transparency, heat resistance and moisture resistance and is useful as an optical polymeric material.

27 Claims, No Drawings

ALKYLIDENENORBORNENE POLYMER AND PROCESS FOR PRODUCING THE SAME

This application is a continuation of application Ser. No. 07/812,482, filed Dec. 23, 1991, now abandoned.

BACKGROUND OF THE INVENTION

1. Field of the Invention

The present invention relates to a novel alkylidenenorbornene polymer excellent in heat resistance, light resistance, transparency and moisture resistance and useful as an optical material and to a process for producing the same.

2. Related Art

Optical polymeric materials mainly used up to now are poly(methyl methacrylate) and polycarbonate. These polymers, however, have drawbacks in that the former shows high water absorption and insufficient heat resistance, while the latter gives injection moldings with high birefringence. Accordingly, it is increasing difficult for these polymers to meet the requirements for optical polymeric materials which are becoming increasingly severe.

As polymeric materials improved in such drawbacks, there have been developed polymers which use polycyclic norbornene-group monomers. For example, it has been disclosed in Japanese Patent Application Kokai (Laid-open) Nos. 60-26,024, 64-24,826, 60-168,708, 61-115,912, 61-120,816 and others that thermoplastic saturated norbornene polymers as hydrogenation products of ring-opening polymers of norbornene monomers and addition-type copolymers of norbornene monomers with ethylene have excellent characteristic properties as optical disk substrate materials.

In the prior arts mentioned above, polycyclic monomers such as tetracyclododecenes must be used as the norbornene monomer to secure high heat resistance required for optical materials. However, the preparation of polycyclic monomers is not always easy. The polycyclic monomers are usually synthesized by addition reaction of norbornenes with cyclopentadiene under heating. While they must be separated and purified by means of distillation since the reaction product contains a substantial amount of byproducts such as oligomers of cyclopentadiene, the separation and purification can be performed only with difficulty. Consequently, polycyclic monomers, particularly tetracyclododecene derivatives, are very expensive and not advantageous for industrial use. Also, they are restricted as to the kinds of available monomers.

On the other hand, it is described in La Chimica et l'Industria, 45, 1,529 (1963) and Macromolecular Chemistry, Rapid Communication, 1, 467 (1980) that, among bicyclic norbornenes, 5-methylidenenorbornene, which has a methylidene group, undergoes transannular polymerization to give a saturated linear polymer. However, 5-methylidenenorbornene used as the monomer is still more difficulty available than said tetracyclododecenes and further has the drawback of being apt to form gels in polymerization. Moreover, the polymer described in La Chimica et l'Industria, 45, 1529 (1963) is crystalline and lacking in optical isotropy, so that it cannot be used as an optical material.

SUMMARY OF THE INVENTION

The present inventors have made extensive study with the aim of developing optical polymers using norbornene monomers that can be obtained more inexpensively. As the result, it has been found that polymers obtained by polymerization of specific alkylidenenorbornenes used as the monomer component with the aid of specific cationic polymerization catalysts contain no gel and are excellent in transparency, heat resistance, light resistance and moisture resistance. The present invention has been attained on the basis of above finding.

According to the present invention, there are provided a novel alkylidenenorbornene polymer comprising as the main component of the principal chain the structural unit represented by the formula

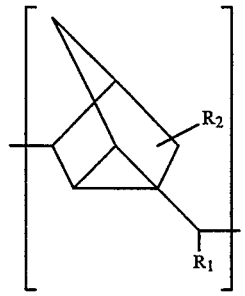

(I)

wherein $R_1$ denotes an alkyl group and $R_2$ denotes a hydrogen atom or an alkyl group, and a process for producing said alkylidenenorbornene polymer which comprises polymerizing alkylidenenorbornenes in the presence of a cationic polymerization catalyst.

DETAILED DESCRIPTION OF PREFERRED EMBODIMENTS

The alkylidenenorbornenes used in the present invention are compounds represented by the formula

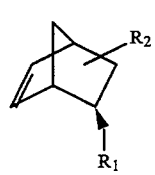

(II)

wherein $R_1$ denotes an alkyl group and $R_2$ denotes a hydrogen atom or an alkyl group. Preferably, $R_1$ is a $C_{1-4}$ alkyl group and $R_2$ is a $C_{1-4}$ alkyl group or a hydrogen atom. More preferably, $R_1$ is a methyl group and $R_2$ is a methyl group or a hydrogen atom. As specific examples, mention may be made of 5-ethylidenenorbornene, 5-propylidenenorbornene, 5-i-propylidenenorbornene, 5-i-butylidenenorbornene and the like. These monomers can be easily obtained by the isomerization of alkenylnorbornene derivatives obtainable by the reaction of dienes, e.g. butadiene, isoprene, 1,3-pentadiene, 3-methyl-1,3-pentadiene and the like, with dicyclopentadiene. These monomers may be used either alone or as a mixture of two or more thereof.

In the present specification, the term "norbornene" includes also norbornene derivative.

In the polymerization it is also possible, in order to improve the characteristic properties as processability, flexibility and mechanical strength of the polymer obtained, to polymerize mixtures of alkylidenenorbornes with other cationically polymerizable monomers than alkylidenenorbornenes. Specific examples of such cationically polymerizable monomers which can be used as mixtures include monoolefins such as propylene, isobutene, 2-methyl-1-butene, 2-methyl-1-pentene and the like, diolefins such as butadiene, isoprene, 1,3-pentadiene and the like, vinylaromatic compounds such as styrene, α-methylstyrene, vinylnaphthalene and the like, and cyclic ethers such as ethylene oxide, propylene oxide, trimethylene oxide, dioxane, trioxane, cyclohexene oxide, styrene oxide, epichlorohydrin, glycidyl phenyl ether, furan, tetrahydrofuran and the like.

The content of the structural unit represented by the formula I in the alkylidenenorbornene polymer of the present invention is usually at least 50% by weight, preferably at least 60% by weight, more preferably at least 70% by weight. As the content of the structural unit represented by the formula I in the alkylidenenorbornene polymer of the present invention decreases, the glass transition temperature of the polymer lowers.

The cationic polymerization catalyst used in the present invention may be conventionally used ones. As specific examples, there may be mentioned, for Lewis acids, metal halides such as $AlCl_3$, $AlBr_3$, $BCl_3$, $BF_3$, $TiCl_4$, $TiBr_4$, $FeCl_3$, $FeCl_2$, $SnCl_2$, $SnCl_4$ and the like and, for protonic acids, hydroacids such as HCl, HF, HBr and the like and oxoacids such as $H_2SO_4$, $H_3BO_3$, $HClO_4$, $CH_3COOH$ and the like. Particularly preferred are Lewis acids, among which halogen compounds, particularly chlorides, of boron or titanium are more preferred.

When a catalyst comprising at least one selected from Lewis acids and protonic acids is used as the cationic polymerization catalyst, it is used in a range of amount of 0.000001–1 mole, preferably 0.00001–0.5 mole, per mole of the polymerizable monomer composition.

Particularly when a Lewis acid is used, it is preferably used in combinations with an initiator compound which are known as so-called Kennedy catalysts in cationic living polymerization of olefins.

The initiator compound used herein is a compound represented by the formula

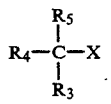

wherein $R_3$ denotes an aliphatic or aromatic hydrocarbon group or a substitution product thereof, $R_4$ and $R_5$ each independently denote a lower aliphatic hydrocarbon group or an aromatic hydrocarbon group, X denotes a hydroxyl group, an alkoxyl group, an acyloxy group or a halogen. Specific examples thereof include tert-butanol, 2,4,4-trimethyl-2-methoxypentane, 2-phenyl-2-propanol, 2-methoxy-2-phenylpropane, 2,5-dimethyl-dihydroxyhexane, 2,5-dimethyl-2,5-diacetoxyhexene, 2,5-dimethyl-2,5-dichlorohexyne, 2,4,4,6-tetramethyl-2,6-dihydroxyheptane, 1,3-bis(2-acetoxy-2-propyl)benzene, 1,4-bis(2-methoxy-2-propyl)benzene, 1,3,4-tris(2-bromo-2-propyl)benzene, 1,3,5-tris(2-methoxy-2-propyl)benzene and the like.

When the catalyst is used in the form of so-called Kennedy catalyst, particularly when a titanium halide, in particular $TiCl_4$ is used, it is more preferable to use an electron donative compound together therewith. The electron donative compound used in the present invention is a compound represented by the formula

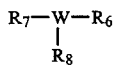

wherein $R_6$, $R_7$ and $R_8$ each independently denote a hydrogen atom, an aliphatic hydrocarbon group or an aromatic hydrocarbon group and W denotes N, NO, P, PO or PS, provided that said aromatic hydrocarbon group may be a heterocyclic ring containing a so-called hetero atom such as nitrogen, oxygen and sulfur and $R_6$, $R_7$ and $R_8$ may form a ring structure, or the formula

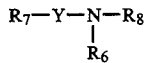

wherein $R_6$, $R_7$ and $R_8$ each independently denote a hydrogen atom, an aliphatic hydrocarbon group or an aromatic hydrocarbon group and Y denotes CO or $SO_2$, provided that said aromatic hydrocarbon group may be a heterocyclic ring containing a so-called hetero atom such as nitrogen, oxygen and sulfur and $R_6$, $R_7$ and $R_8$ may form a ring structure, or the formula $$R_6\text{-}Z\text{-}R_7 \qquad (VI)$$

wherein $R_1$ and $R_2$ each independently denote a hydrogen atom, an aliphatic hydrocarbon group or an aromatic hydrocarbon group and Z denotes O, CO, COO, OCOO, S, SO or $SO_2$, provided that said aromatic hydrocarbon group may be a heterocyclic ring containing a so-called hetero atom such as nitrogen, oxygen and sulfur and $R_6$ and $R_7$ may form a ring structure, or the formula

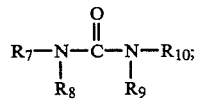

wherein $R_7$, $R_8$, $R_9$ and $R_{10}$ each independently denote a hydrogen atom, an aliphatic hydrocarbon group or an aromatic hydrocarbon group, provided that said aromatic hydrocarbon group may be a heterocyclic ring containing a so-called hetero atom such as nitrogen, oxygen and sulfur and $R_1$, $R_2$, $R_3$ and $R_4$ may form a ring structure.

Specific examples of the electron donative compound represented by the formula (IV) include diethylamine, triethylamine, pyridine, thiazole, guanidine, N-methylmorpholine oxide, triphenylphosphine, triphenyl phosphate and the like. Specific examples of the electron donative compound represented by the formula (V) include acetamide, N,N-dimethylformamide, N,N-dimethylacetamide, N-methylpyrrolidone, maleimide, benzenesulfonamide, saccharin and the like. Specific examples of the electron donative compound represented by the formula (VI) include diethyl ether, phenetole, tetrahydrofuran, pyran, dioxane, tetrahydrothiophene, benzaldehyde, acetic acid, benzoic acid, succinic anhydride, acetone, acetonitrile, ethyl acetate and the like. Specific examples of the electron donative compound represented by the formula (VII) include tetramethylurea, dicyclohexylurea, N,N-dimethylimidazolidinone and the like. Particularly preferred among these compounds are tertiary amines or aromatic amines such as triethylamine, pyridine and the like, phosphorus compounds such as triphenylphosphine, triphenyl phosphate and the like, carboxylic acid amides such as N,N-dimethylformamide, N,N-dimethylacetamide and the like, ethers such as diethyl ether, tetrahydrofuran and the like, sulfoxides such as dimethyl sulfoxide and the like, ketones such as acetone and the like, and esters such as ethyl acetate and the like.

The amount of the initiator compound to be used is 0.01-1 mole in terms of the functional group of the initiator compound (that is, the hydroxyl group, alkoxyl group, acyloxy group or halogen denoted by X in the formula (III)) per mole of the Lewis acid. The amount of the electron donative compound to be used is 0.01-100 moles per mole of the functional group of the initiator compound.

Although the polymerization of the present invention may be performed without using a solvent, it is usually preferable to use halogenated hydrocarbon solvents such as methyl chloride, methylene chloride, 1,2-dichloroethane, 1,1,1-trichloroethane, 1,1,2-trichloroethane, 1,1,2-trichloroethylene and the like, hydrocarbon solvents such as pentane, hexane, heptane, octane, cyclopentane, cyclohexane, decalin, methylcyclohexane and the like, aromatic solvents such as benzene, toluene, xylene and the like, or other suitable solvents.

The polymerization is usually conducted in a temperature range of $-150°$ C. to $100°$ C., preferably $-100°$ C. to $50°$ C.

The alkylidenenorbornene polymer of the present invention contains virtually no olefinic bonds, is amorphous, optically isotropic and transparent, and has a higher glass transition temperature as compared with ring-opening polymers of the same monomer. For example, in the case of polymers comprising solely the structural unit represented by the formula I, polymers having a glass transition temperature of $150°$ C. or more can be easily obtained. Though the glass transition temperature can be adjusted by use of a suitable comonomer, it is preferably selected at $100°$ C. or more, more preferably $120°$ C. or more. The range of the molecular weight is, in terms of intrinsic viscosity determined in Decalin (decahydronaphthalene) at $50°$ C., 0.1-20 dl/g, preferably 0.2-10 dl/g, more preferably 0.4-5 dl/g. As the intrinsic viscosity decreases, the mechanical strength of the molded articles decreases. As the intrinsic viscosity increases, the melt viscosity increases and the processability becomes poorer. The polymer of the present invention contains substantially no gel and can be dissolved in suitable solvents. For example, it dissolves completely in decalin at $50°$ C. Further, since the polymer of the present invention is obtained by polymerization of hydrocarbon monomers, it is excellent in moisture resistance. Its water absorption after immersion in water at $25°$ C. for 24 hours is 0.2% or less, preferably 0.1% or less.

The alkylidenenorbornene polymer of the present invention can be processed by conventional methods. In the processing, various additives may be added for the purpose of improving processability and properties of the product, which include, for example, fibrous or particulate fillers, antioxidants, light stabilizers, ultraviolet absorbers, antistatic agents, lubricants, flame retardants, pigment, dyes, antiblocking agents, other kinds of polymers, and oligomers.

The alkylidenenorbornene polymer of the present invention is amorphous, has a high glass transition temperature and is excellent in heat resistance, light resistance, moisture resistance, and transparency, so that it is useful as various formed articles in a wide field of applications including optical materials. For example, it can be used for optical materials such as optical disks, optical lenses, optical cards, optical fibers, liquid crystal display device substrates, and the like, electric or lectronic uses such as printed boards, high frequency circuit boards, insulating materials and the like, medical uses, chemical materials, structural materials such as film, sheeting, various instrument parts and housings and the like, building materials, and in other various fields.

EXAMPLE

The present invention will be described in more detail below with reference to Examples, in which "part" means part by weight unless otherwise specified.

EXAMPLE 1

In a reactor flushed with nitrogen, were placed 900 parts of methylene chloride and 100 parts of 5-ethylidenenorbornene. While the temperature was being kept at $-50°$ C., 0.5 part of 2-methoxy-2-phenylpropane and successively 3.8 parts of $TiCl_3$ were added thereto, and the whole was reacted at $-50°$ C. for 2 hours. The reaction solution was poured into 5,000 parts of methanol at room temperature to coagulate the polymer formed. The precipitate was separated by filtration and dried under reduced pressure to obtain 63 parts of amorphous polymer.

The polymer obtained dissolved completely in Decalin (decahydronaphthalene). It had an intrinsic viscosity of 0.57 dl/g as determined in Decalin (decahydronaphthalene) at $50°$ C. and a glass transition temperature of $163°$ C. as determined by DSC analysis. Its infrared spectrum showed a strong absorption band at 850 $cm^{-1}$ attributed to transannular polymerization (cf. La Chimica et l'Industria, 45, 1529 (1963)). Analysis by proton NMR spectrum in deutero chloroform showed at 0.4-2.6 ppm the presence of protons of saturated hydrocarbons amounting to 98.9% of the total protons. Though a very small amount of olefinic protons was observed at 4.8-5.6 ppm, the amount was only 1.1% relative to the total protons, showing that the content of components having unsaturated groups was very small.

The polymer was compression-molded at $210°$ C. to prepare test pieces 5 cm square and 2 mm thick. The molded plate was tough, colorless and transparent. The light transmittance at 830 nm was as good as 90%. The water absorption after immersion in water at $25°$ C. for 24 hours was 0.01% or less.

EXAMPLE 2

In the same manner as in Example 1 except for using 90 parts of 5-ethylidenenorbornene and 10 parts of styrene in place of 5-ethylidenenorbornene alone, 72 parts of amorphous polymer was obtained.

The polymer obtained dissolved completely in Decalin (decahydronaphthalene) and had an intrinsic viscosity of 0.61 dl/g as determined in Decalin (decahydronaphthalene) at $50°$ C. Its glass transition temperature determined by DSC analysis was a single point of $155°$ C. The infrared absorption spectrum showed at 850 $cm^{-1}$ a strong absorption band based on transannular polymer. Analysis by proton NMR spectrum in deutero chloroform showed saturated hydrocarbon protons at 0.4-2.7 ppm and phenyl group protons at 6.8-7.1 ppm in an area ratio of 95:5. Virtually no olefinic protons were observed. From the fact that the glass transition temperature consisted of one point, it was revealed that the composition obtained was not a blend of homopolymers but a copolymer of 5-ethylidenenorbornene with styrene. From the area ratio of saturated hydrocarbon protons to phenyl group protons, it was revealed that the ratio of the structural units derived from styrene to the structural units represented by the formula (I) in the copolymer was about 11 to 89.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.01% or less.

EXAMPLE 3

In the same manner as in Example 1 except for using 50 parts of 5-ethylidenenorbornene and 50 parts of styrene in place of 5-ethylidenenorbornene alone, 69 parts of amorphous polymer was obtained.

The polymer obtained dissolved completely in Decalin (decahydronaphthalene) and had an intrinsic viscosity of 0.59 dl/g as determined in Decalin (decahydronaphthalene) at 50° C. Its glass transition temperature determined by DSC analysis was a single point of 132° C. The infrared absorption spectrum showed at 850 cm$^{-1}$ a strong absorption band based on transannular polymer. Analysis by proton NMR spectrum in deutero chloroform showed saturated hydrocarbon protons at 0.4–2.7 ppm and phenyl group protons at 6.8–7.1 ppm in an area ratio of 84:16. Virtually no olefinic protons were observed. From the fact that the glass transition temperature consisted of one point, it was revealed that the composition obtained was not a blend of homopolymers but a copolymer of 5-ethylidenenorbornene with styrene. From the area ratio of saturated hydrocarbon protons to phenyl group protons, it was revealed that the ratio of the structural units derived from styrene to the structural units represented by the formula (I) in the copolymer was about 34 to 66.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.01% or less.

EXAMPLE 4

In the same manner as in Example 1 except for using 95 parts of 5-ethylidenenorbornene and 5 parts of cyclohexene oxide in place of 5-ethylidenenorbornene alone, 48 parts of amorphous polymer was obtained.

The polymer obtained dissolved completely in Decalin (decahydronaphthalene) and showed an intrinsic viscosity of 0.45 dl/g as determined in Decalin (decahydronaphthalene) at 50° C. and a glass transition temperature of 148° C. by DSC analysis. The infrared absorption spectrum showed at 850 cm$^{-1}$ a strong absorption band based on transannular polymer. Analysis by proton NMR spectrum in deutero chloroform showed saturated hydrocarbon protons at 0.4–3.0 ppm amounting to 99.3% of the total protons. Though a very small amount of olefinic protons was observed at 4.8–5.6 ppm, the amount was only 0.7% relative to the total protons, showing that the content of components having unsaturated groups was very small.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.1% or less.

EXAMPLE 5

In the same manner as in Example 1 except for using 90 parts of 5-ethylidenenorbornene and 10 parts of α-methylstyrene in place of 5-ethylidenenorbornene alone, 95 parts of amorphous polymer was obtained.

The polymer obtained dissolved completely in decalin and had an intrinsic viscosity of 0.59 dl/g as determined in Decalin (decahydronaphthalene) at 50° C. Its glass transition temperature determined by DSC analysis was a single point of 160° C. The infrared absorption spectrum showed at 850 cm$^{-1}$ a strong absorption band based on transannular polymer. Analysis by proton NMR spectrum in deutero chloroform showed saturated hydrocarbon protons at 0.4–2.7 ppm and phenyl group protons at 6.8–7.1 ppm in an area ratio of 96:4. Virtually no olefinic protons were observed. From the fact that the glass transition temperature consisted of one point, it was revealed that the composition obtained was not a blend of homopolymers but a copolymer of 5-ethylidenenorbornene with α-methylstyrene. From the area ratio of saturated hydrocarbon protons to phenyl group protons, it was revealed that the ratio of the structural units derived from α-methylstyrene to the structural units represented by the formula (I) was about 12 to 88.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.01% or less.

EXAMPLE 6

In the same manner as in Example 1 except for using 75 parts of 5-ethylidenenorbornene and 25 parts of α-methylstyrene in place of 5-ethylidenenorbornene alone, 93 parts of amorphous polymer was obtained.

The polymer obtained dissolved completely in Decalin (decahydronaphthalene) and had an intrinsic viscosity of 0.56 dl/g as determined in Decalin (decahydronaphthalene) at 50° C. Its glass transition temperature determined by DSC analysis was a single point of 160° C. The infrared absorption spectrum showed at 850 cm$^{-1}$ a strong absorption band based on transannular polymer. Analysis by proton NMR spectrum in deutero chloroform showed saturated hydrocarbon protons at 0.4–2.7 ppm and phenyl group protons at 6.8–7.1 ppm in an area ratio of 90:10. Virtually no olefinic protons were observed. From the fact that the glass transition temperature consisted of one point, it was revealed that the composition obtained was not a blend of homopolymers but a copolymer of 5-ethylidenenorbornene with α-methylstyrene. From the area ratio of saturated hydrocarbon protons to phenyl group protons, it was revealed that the ratio of the structural units derived from α-methylstyrene to the structural units represented by the formula (I) was about 27 to 73.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.01% or less.

EXAMPLE 7

In the same manner as in Example 1 except for using 90 parts of 5-ethylidenenorbornene and 10 parts of isobutene in place of 5-ethylidenenorbornene alone, 80 parts of amorphous polymer was obtained.

The polymer obtained dissolved completely in Decalin (decahydronaphthalene) and had an intrinsic viscosity of 0.62 dl/g as determined in Decalin (decahydronaphthalene) at 50° C. The glass transition temperature determined by DSC analysis was a single point of 142° C. The infrared absorption spectrum showed at 850 cm$^{-1}$ a strong absorption band based on transannular polymer. Virtually no olefinic protons were observed. From the fact that the glass transition temperature consisted of one point, it was revealed that the composition obtained was not a blend of homopolymers but a copolymer of 5-ethylidenenorbornene with isobutene.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.01% or less.

EXAMPLE 8

In the same manner as in Example 1 except for using 75 parts of 5-ethylidenenorbornene and 25 parts of isobutene in place of 5-ethylidenenorbornene alone, 75 parts of amorphous polymer was obtained.

The polymer obtained dissolved completely in Decalin (decahydronaphthalene) and had an intrinsic viscosity of 0.58 dl/g as determined in Decalin (decahydronaphthalene) at 50° C. The glass transition temperature determined by DSC analysis was a single point of 138° C. The infrared absorption spectrum showed at 850 cm$^{-1}$ a strong absorption band based on transannular polymer. Virtually no olefinic protons were observed. From the fact that the glass transition temperature consisted of one point, it was revealed that the composition obtained was not a blend of homopolymers but a copolymer of 5-ethylidenenorbornene with isobutene.

Test pieces 2 mm in thickness were prepared in the same manner as in Example 1. The molded plate was tough, colorless and transparent. The light transmittance at 830 nm was as good as 90%. The water absorption after immersion in water at 25° C. for 24 hours was 0.01% or less.

From the results set forth above, it is apparent that the alkylidenenorbornene polymer of the present invention is excellent in light resistance, transparency, heat resistance and moisture resistance.

What is claimed is:

1. An alkylidenenorbornene polymer, having an intrinsic viscosity of 0.2 to 10 dl/g measured at 50° C. in decahydronaphthalene a principal chain comprising at least 50% by weight of a structural unit represented by the formula (I):

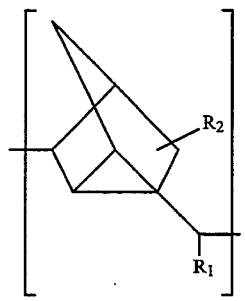

wherein $R_1$ denotes an alkyl group and $R_2$ denotes a hydrogen atom or an alkyl group.

2. An alkylidenenorbornene polymer according to claim 1, wherein $R_1$ is a $C_{1-4}$ alkyl group and $R_2$ is a $C_{1-4}$ alkyl group, or a hydrogen atom.

3. An alkylidenenorbornene polymer according to claim 2, wherein $R_1$ is a methyl group and $R_2$ is a methyl group, or a hydrogen atom.

4. An alkylidenenorbornene polymer according to claim 1 which has a glass transition of 150° C. or more.

5. An alkylidenenorbornene polymer, having an intrinsic viscosity of 0.2 to 10 dl/g measured at 50° C. in decahydronaphthalene, which comprises a principal chain comprising at least 50% by weight of a first structural unit represented by the following formula I:

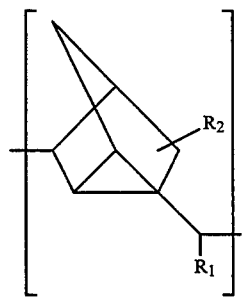

wherein $R_1$ denotes an alkyl group and $R_2$ denotes a hydrogen atom or an alkyl group, and, in addition to said first structural unit, as a second structural unit in said principal chain, a different cationically polymerized monomer.

6. An alkylidenenorbornene polymer according to claim 5, wherein said cationically polymerizable monomer is a member selected from the group consisting of monoolefins, diolefins, vinylaromatic compounds and cyclic ethers.

7. An alkylidenenorbornene polymer according to claim 6, wherein said cationically polymerizable monomer is a member selected from the group consisting of isobutene, styrene, α-methylstyrene and cyclohexene oxide.

8. An alkylidenenorbornene polymer according to claim 5 which contains at least 70% by weight of the structural unit represented by the formula (I).

9. An alkylidenenorbornene polymer according to claim 5 which has a glass transition temperature of 100° C. or more.

10. An alkylidenenorbornene polymer according to claim 9 which has a glass transition temperature of 120° C. or more.

11. An alkylidenenorbornene polymer according to claim 1 which has an intrinsic viscosity of 0.4 to 5 dl/g in decahydronaphthalene at 50° C.

12. An alkylidenenorbornene polymer according to claim 1 which has a water absorption of 0.2% or less after immersion in water at 25° C. for 24 hours.

13. An alkylidenenorbornene polymer according to claim 12 which has a water absorption of 0.1% or less after immersion in water at 25° C. for 24 hours.

14. A shaped article having excellent optical properties comprising a polymer as claimed in claim 1.

15. A shaped article having excellent optical properties comprising a polymer as claimed in claim 5.

16. A process for producing an alkylidenenorbornene polymer having an intrinsic viscosity of 0.2 to 10 dl/g measured at 50° C. in decahydronaphthalene comprising a principal chain comprising at least 50% by weight of a structural unit represented by the formula (I):

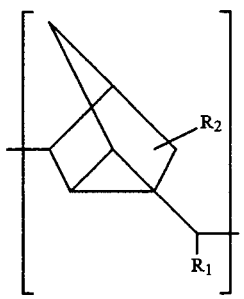

(I)

wherein $R_1$ denotes an alkyl group and $R_2$ denotes a hydrogen atom or an alkyl group, which comprises:
polymerizing an alkylidenenorbornene represented by the formula (II):

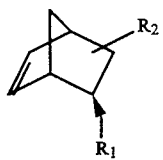

(II)

wherein $R_1$ and $R_2$ are the same meanings as defined above, or a mixture thereof with a comonomer cationically copolymerizable therewith, in the presence of a catalyst comprising a Lewis acid and an initiator compound of the formula (III):

(III)

wherein $R_3$ denotes an aliphatic or aromatic hydrocarbon group, $R_4$ and $R_5$ each independently denote a lower aliphatic hydrocarbon group or an aromatic hydrocarbon group, X denotes a hydroxyl group, an alkoxyl group, an acyloxy group or a halogen.

17. A process for producing an alkylidenenorbornene polymer having an intrinsic viscosity of 0.2 to 10 dl/g measured at 50° C. in decahydronaphthalene comprising a principal chain comprising at least 50% by weight of a structural unit represented by the formula (I):

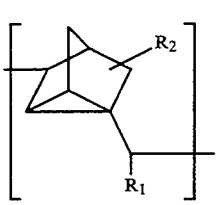

(I)

wherein $R_1$ denotes an alkyl group and $R_2$ denotes a hydrogen atom or an alkyl group, which comprises:
polymerizing an alkylidenenorbornene represented by the formula II:

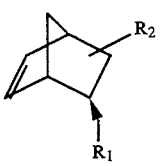

(II)

wherein $R_1$ and $R_2$ are the same meanings as defined above, or a mixture thereof with a comonomer cationically copolymerizable therewith, in the presence of a catalyst comprising a Lewis acid and as an initiator at least one compound selected from the group consisting of 2,5-dimethyl-dihydroxyhexane, 2,5-dimethyl-2,5-diacetoxyhexane, 2,5-dimethyl-2,5-dichlorohexyne, 2,4,4,6-tetramethyl-2,6-dihydroxy heptane, 1,3-bis(2-acetoxy-2-propyl)benzene, 1,4-bis(2-methoxy-2-propyl)benzene, and 1,3,4-tris (2-bromo-2-propyl)benzene.

18. A process according to claim 16 wherein $R_1$ and $R_2$ are independently a $C_1$-$C_4$ alkyl group, or $R_2$ is a hydrogen atom.

19. A process according to claim 18 wherein $R_1$ is a methyl group and $R_2$ is a methyl group or a hydrogen atom.

20. A process according to claim 16, wherein the Lewis acid is a boron halide or a titanium halide.

21. A process according to claim 16, wherein an electron donopa compound is further used.

22. A process according to claim 16, wherein said polymerizing is carried out at a temperature of from $-150°$ C. to 100° C.

23. A process as claimed in claim 16 wherein said initiator is at least one member selected from the group consisting of tert-butanol, 2,2,4-trimethyl-2-methoxy pentane, 2-phenyl-2-propanol and 2-methoxy-2-phenylpropane.

24. A process as claimed in 21 wherein the electron donor is at least one compound represented by the formula (IV)

(IV)

wherein $R_6$, $R_7$ and $R_8$ each independently denote a hydrogen atom, an aliphatic hydrocarbon group or an aromatic group, or $R_6$, $R_7$ and $R_8$ may form a ring structure;and W denotes N, NO, P, PO or PS.

25. A process as claimed in claim 21 wherein the electron donor is at least one compound represented by the formula (V):

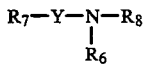   (V)

wherein $R_6$, $R_7$ and $R_8$ each independently denote a hydrogen atom, an aliphatic hydrocarbon group or an aromatic group, or $R_6$, $R_7$ and $R_8$ may form a ring structure; and Y denotes CO or $SO_2$.

26. A process as claimed in claim 21 wherein the electron donor is at least one compound represented by the formula (VI)

   (VI)

wherein $R_6$ and $R_7$ each independently denote a hydrogen atom, an aliphatic hydrocarbon group or an aromatic group, or $R_7$ and $R_8$ may form a ring structure; and Z denotes O, CO, COO, OCOO, S, SO or $SO_2$.

27. A process as claimed in claim 21, wherein the electron donor is at least one compound represented by the formula (VII)

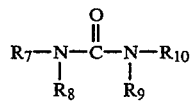   (VII)

wherein $R_7$, $R_8$, $R_9$ and $R_{10}$ each independently denote a hydrogen atom, an aliphatic group or an aromatic group, or $R_7$, $R_8$, $R_9$ and $R_{10}$ may form a ring structure.

* * * * *